(12) United States Patent
Kawakita (10) Patent No.: US 7,490,232 B2
(45) Date of Patent: Feb. 10, 2009

(54) DISK DEVICE USING DISK TO REWRITE FIRMWARE AND FIRMWARE DETERMINATION METHOD

(75) Inventor: Mitsuru Kawakita, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 454 days.

(21) Appl. No.: 11/283,553

(22) Filed: Nov. 18, 2005

(65) Prior Publication Data

US 2006/0136711 A1    Jun. 22, 2006

(30) Foreign Application Priority Data

Dec. 16, 2004    (JP)    ............... 2004-364402

(51) Int. Cl.
*G06F 9/00* (2006.01)
*G06F 9/44* (2006.01)
(52) U.S. Cl. ............... 713/1; 713/100; 717/168
(58) Field of Classification Search .......... 713/100, 713/1
See application file for complete search history.

(56) References Cited

U.S. PATENT DOCUMENTS

| | | | |
|---|---|---|---|
| 6,446,199 B1 * | 9/2002 | Howe et al. ............ 713/1 |
| 6,678,741 B1 * | 1/2004 | Northcutt et al. ......... 709/248 |
| 6,754,723 B2 * | 6/2004 | Kato .................. 710/8 |
| 6,792,452 B1 * | 9/2004 | Philyaw .............. 709/217 |
| 7,043,166 B2 * | 5/2006 | Parry et al. ............ 399/12 |
| 2003/0233493 A1 * | 12/2003 | Boldon et al. ........... 710/1 |
| 2004/0143828 A1 * | 7/2004 | Liu et al. ............. 717/168 |
| 2004/0205745 A1 * | 10/2004 | Piazza ............... 717/168 |

FOREIGN PATENT DOCUMENTS

JP    57209551 A  * 12/1982
JP    2000-207180     7/2000

OTHER PUBLICATIONS

Patent Abstracts of Japan, Publication No. 2000-207180 dated Jul. 28, 2000 (1 page).

* cited by examiner

*Primary Examiner*—Suresh K Suryawanshi
(74) *Attorney, Agent, or Firm*—Osha • Liang LLP (57) ABSTRACT

In the case where a disk storing firmware for rewriting is used to upgrade firmware stored in a flash memory, byte codes #15, #16 of the disk corresponding to a reserve code (byte codes #15, #16) of the flash memory are ignored. Specifically, byte codes #1 to #14 of the flash memory are compared with byte codes #1 to #14 of the disk. If all codes match each other, it is determined that the firmware of the disk is firmware of a compatible model and a rewrite operation is started. Therefore, under the condition that the disk device is of a compatible model, the firmware of the device can be upgraded and thus the firmware is improved in compatibility.

4 Claims, 5 Drawing Sheets

DISK DEVICE USING DISK TO REWRITE FIRMWARE AND FIRMWARE DETERMINATION METHOD

BACKGROUND OF THE INVENTION

1. Field of the Invention

The present invention relates to a disk device and a firmware determination method. In particular, the invention relates to a disk device using a disk to rewrite firmware that is stored in a nonvolatile memory for performing basic control of the disk device and to a determination method for the firmware.

2. Description of the Background Art

A disk device includes firmware that is provided in advance for basic control of hardware. The firmware is software that is stored in a flash memory (nonvolatile memory) as a program executed immediately after the system is powered and that is embedded in advance in the disk device. The firmware functions as a part of the hardware. When it is necessary to change any function of the device or correct any malfunction, the firmware is rewritten to be upgraded (updated).

The firmware includes an HW code (hardware code) specifying the attribute of the target hardware (hardware controlled by the firmware). There are disk devices of many models, and the HW code is different depending on the model. In the case where a disk having firmware stored thereon for rewriting (firmware of a new version) is used to upgrade the firmware in the disk device, the disk is inserted into the disk device, the HW code of the firmware in the device is compared with the HW code of the firmware on the disk. If the HW codes are identical to each other (if the firmware in the device and the firmware on the disk are of the same model), the firmware in the device is rewritten.

Japanese Patent Laying-Open No. 2000-207180 discloses an information processing device having a memory card storing a determination routine for determining in what case a program in the device should be rewritten. The determination routine is executed by the device on the memory card to determine whether or not upgrade is necessary. In this way, the information processing device can individually and appropriately address various environmental changes occurring after product shipment.

It is supposed here that a disk device of model A and a disk device of model B have respective functions similar to each other (these disk devices are of models that are functionally compatible with each other, hereinafter referred to as "compatible models") while respective flash memories are different in capacity for example and accordingly respective firmwares stored respectively in the flash memories are different in HW code. In this case, even if it is tried to use a disk storing new-version firmware compatible with the disk device of model B for the purpose of upgrading the firmware of the disk device of model A, this upgrade cannot be achieved due to the HW codes different from each other. Specifically, the upgrade cannot be achieved since it is determined that the firmware of the disk is incompatible with the disk device because the HW code of the disk's firmware differs from that of the disk device. Thus, there arises a necessity to improve compatibility of the firmware, so that respective firmwares of disk devices that are of different models while they are compatible with each other can be upgraded using firmware of any of the compatible models.

SUMMARY OF THE INVENTION

A main object of the present invention is thus to provide a disk device superior in compatibility of firmware for upgrade as well as a firmware determination method.

A disk device according to the present invention is a disk device including: a nonvolatile memory storing first firmware for performing basic control of the disk device; and a control unit determining whether or not second firmware stored on a disk is compatible firmware. The first firmware stored in the nonvolatile memory includes a first attribute code that represents an attribute of hardware of the disk device, and the second firmware stored on the disk includes a second attribute code that represents an attribute of target hardware and that is different in code length from the first attribute code. At least one of the first firmware and the second firmware further includes a reserve code adjusting the code length of the attribute code of that one of the first firmware and the second firmware so as to match the adjusted code length with the code length of the attribute code of the other of the first firmware and the second firmware. The control unit of the disk device responds to a command to rewrite the first firmware to compare the first attribute code with the second attribute code while ignoring a code corresponding to the reserve code. When the first and second attribute codes match each other, the control unit determines that the second firmware is compatible firmware to start a rewrite operation. When the first and second attribute codes mismatch, the control unit determines that the second firmware is incompatible firmware to cancel a rewrite operation.

Preferably, the first attribute code and the second attribute code are each comprised of byte codes represented by hexadecimal numbers from "01" to "FF," and the reserve code is comprised of a byte code represented by "00."

According to a firmware determination method of the present invention, first firmware stored in a nonvolatile memory includes a first attribute code that represents an attribute of hardware of the disk device and second firmware stored on a disk includes a second attribute code that represents an attribute of target hardware and that is different in code length from the first attribute code. At least one of the first firmware and the second firmware further includes a reserve code adjusting the code length of the attribute code of that one of the first firmware and the second firmware so as to match the adjusted code length with the code length of the attribute code of the other of the first firmware and the second firmware. In response to a command to rewrite the first firmware, the first attribute code is compared with the second attribute code while a code corresponding to the reserve code is ignored and, when the first and second attribute codes match each other, it is determined that the second firmware is compatible firmware and, when the first and second attribute codes mismatch, it is determined that the second firmware is incompatible firmware.

Accordingly, a chief advantage of the present invention is that a rewrite operation can be performed even when the first and second attribute codes are different in code length from each other. Thus, firmware of the disk device of a compatible model can be upgraded and the firmware is improved in compatibility.

The foregoing and other objects, features, aspects and advantages of the present invention will become more appar-

DESCRIPTION OF THE PREFERRED EMBODIMENTS

First Embodiment

Figure 1:
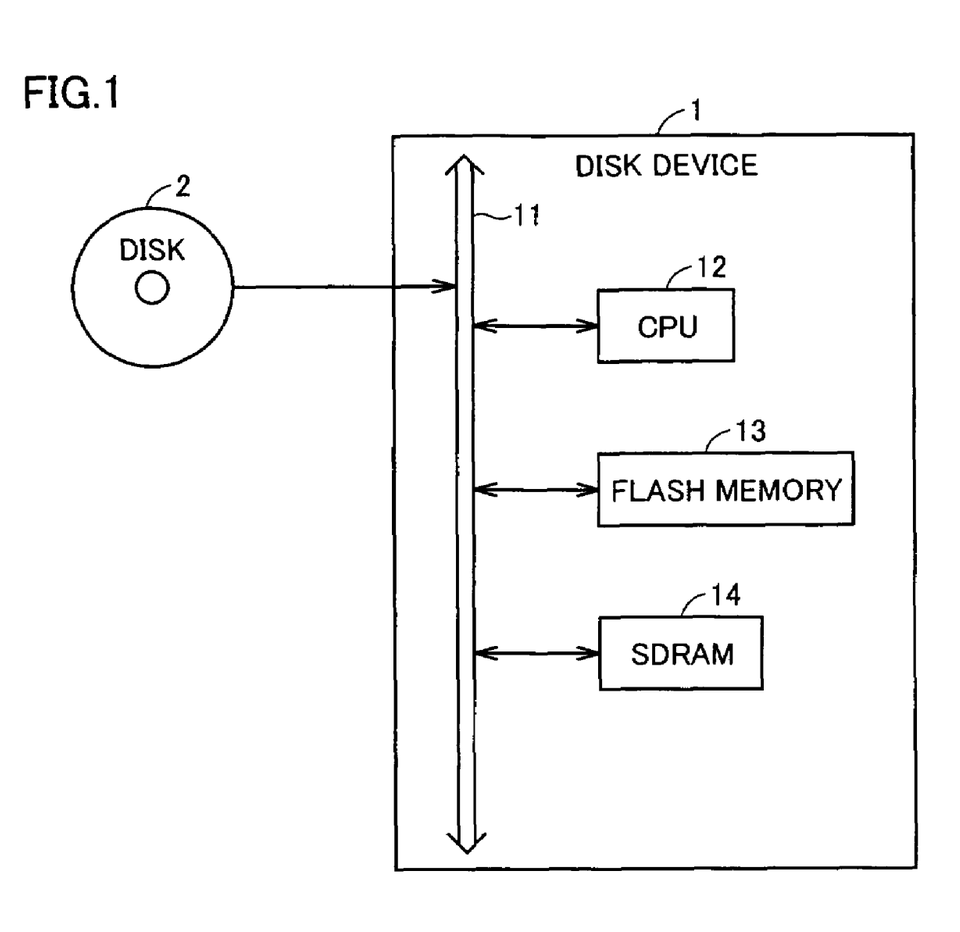
FIG. 1 is a schematic block diagram showing a structure of a disk device according to a first embodiment of the present invention.

Referring to FIG. 1, a disk device 1 includes an internal bus 11, a CPU (Central Processing Unit) 12, a flash memory 13, and an SDRAM (Synchronous Dynamic Random Access Memory) 14. In disk device 1, flash memory 13 and SDRAM 14 are connected through internal bus 11 to CPU 12. CPU 12 controls the whole operation of disk device 1. When a disk 2 for upgrade is inserted into disk device 1, an operation of reading a disk 2 is performed through internal bus 11.

In flash memory 13, firmware is stored in advance. The firmware is software provided in advance in disk device 1 as a program for basic control of hardware. The firmware functions as a part of the hardware. CPU 12 executes the firmware stored in flash memory 13 to fulfill chief functions of disk device 1. Flash memory 13 is a rewritable nonvolatile memory. When it is necessary to change any function of the device or correct any malfunction, the firmware is rewritten to be upgraded.

In the case where the firmware stored in flash memory 13 is upgraded, disk 2 storing firmware for rewriting (firmware of a new version) is inserted into disk device 1. CPU 12 reads the firmware on disk 2 into SDRAM 14. The firmware which is read into SDRAM 14 and the firmware in flash memory 13 are compared with each other. If the result of the comparison shows that the firmware read into SDRAM 14 is firmware of a compatible model, the firmware is transferred from SDRAM 14 to flash memory 13. In this way, the firmware stored in flash memory 13 is rewritten to be upgraded.

Figure 2:
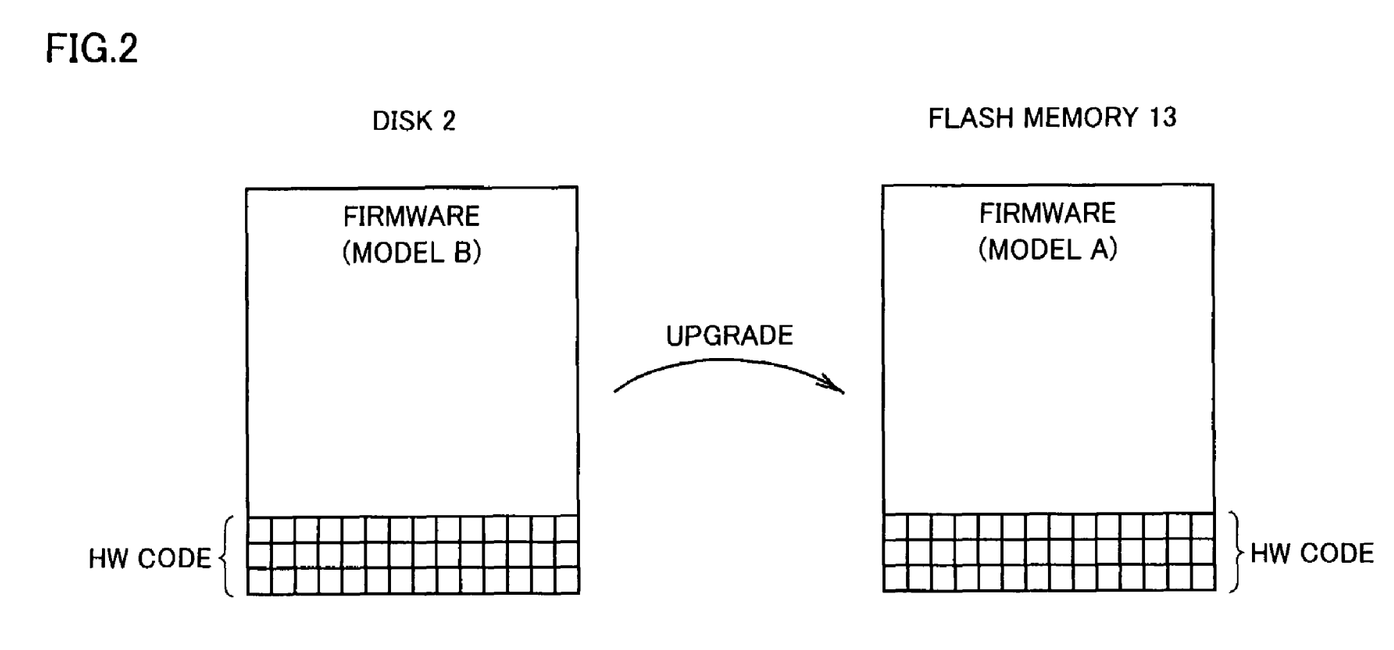
FIG. 2 illustrates a firmware upgrade operation.

FIG. 2 illustrates a firmware upgrade operation. Referring to FIG. 2, using disk 2 on which stored firmware of a new version compatible with a disk device of model B, the firmware of disk device 1 of model A is to be upgraded. The firmware of model A stored in flash memory 13 and the firmware of model B stored on disk 2 include respective HW codes each specifying the attribute of target hardware. Here, the disk device of model A and the disk device of model B have respective functions similar to each other (these disk devices are of models that are functionally compatible with each other, namely "compatible models") while respective flash memories are different in capacity for example and accordingly respective firmwares stored respectively in the flash memories are different in HW code. In the case where the firmware in flash memory 13 is to be upgraded, it is determined first, based on the HW code of the firmware in flash memory 13 and the HW code of the firmware on disk 2, whether or not the firmware on disk 2 is firmware of a compatible model. When it is determined that the firmware on the disk is firmware of a compatible model, it is confirmed that the firmware on disk 2 is of a new version and thereafter the firmware in flash memory 13 is rewritten into the firmware of the new version.

Figure 3:
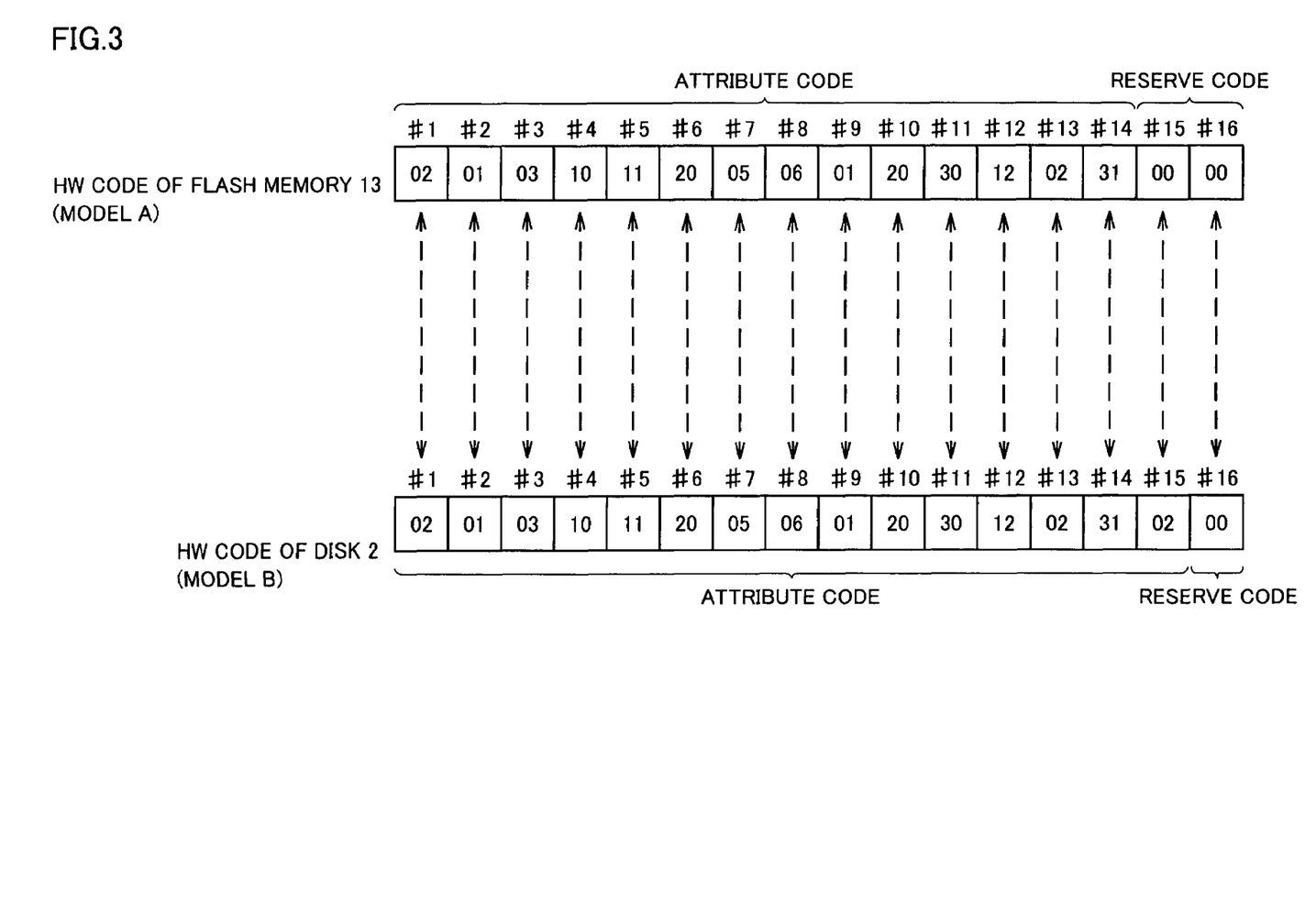
FIG. 3 shows respective structures of an HW code of firmware of a flash memory and an HW code of firmware of a disk.

FIG. 3 shows respective exemplary structures of the HW code of the firmware in flash memory 13 and the HW code of the firmware on disk 2. Referring to FIG. 3, the HW code of the firmware in flash memory 13 and the HW code of the firmware on disk 2 are each comprised of byte codes #1 to #16 each having one byte (two digits) represented by hexadecimal numbers "00" to "FF." The HW code of flash memory 13 includes an attribute code comprised of byte codes #1 to #14 represented by hexadecimal numbers "00" to "FF." This attribute code is a code substantially indicating the attribute of hardware of model A. Further, the HW code of flash memory 13 includes a reserve code comprised of byte codes #15, #16 each represented by "00." This reserve code is an extra code that does not substantially indicate the attribute of the hardware of model A.

The HW code of disk 2 includes an attribute code comprised of byte codes #1 to #15 represented by hexadecimal numbers "01" to "FF." This attribute code is a code substantially indicating the attribute of hardware of model B. Further, the HW code of disk 2 includes a reserve code comprised of byte code #16 represented by "00." This reserve code is an extra code that does not substantially indicate the attribute of the hardware of model B.

As seen from FIG. 3, the attribute code of flash memory 13 has its code length (14) different from the code length (15) of the attribute code of disk 2. Then, the reserve code of code length (2) is provided to flash memory 13 while a reserve code of code length (1) is provided to disk 2 to match respective code lengths of the HW codes of flash memory 13 and disk 2.

As disk 2 is inserted into disk device 1 and an instruction to rewrite firmware (firmware rewrite command) is given, CPU 12 checks the HW code of the firmware of flash memory 13 and the HW code of the firmware of disk 2 on the byte-code basis, and then determines whether or not the firmware on disk 2 is firmware of a compatible model.

Figure 4:
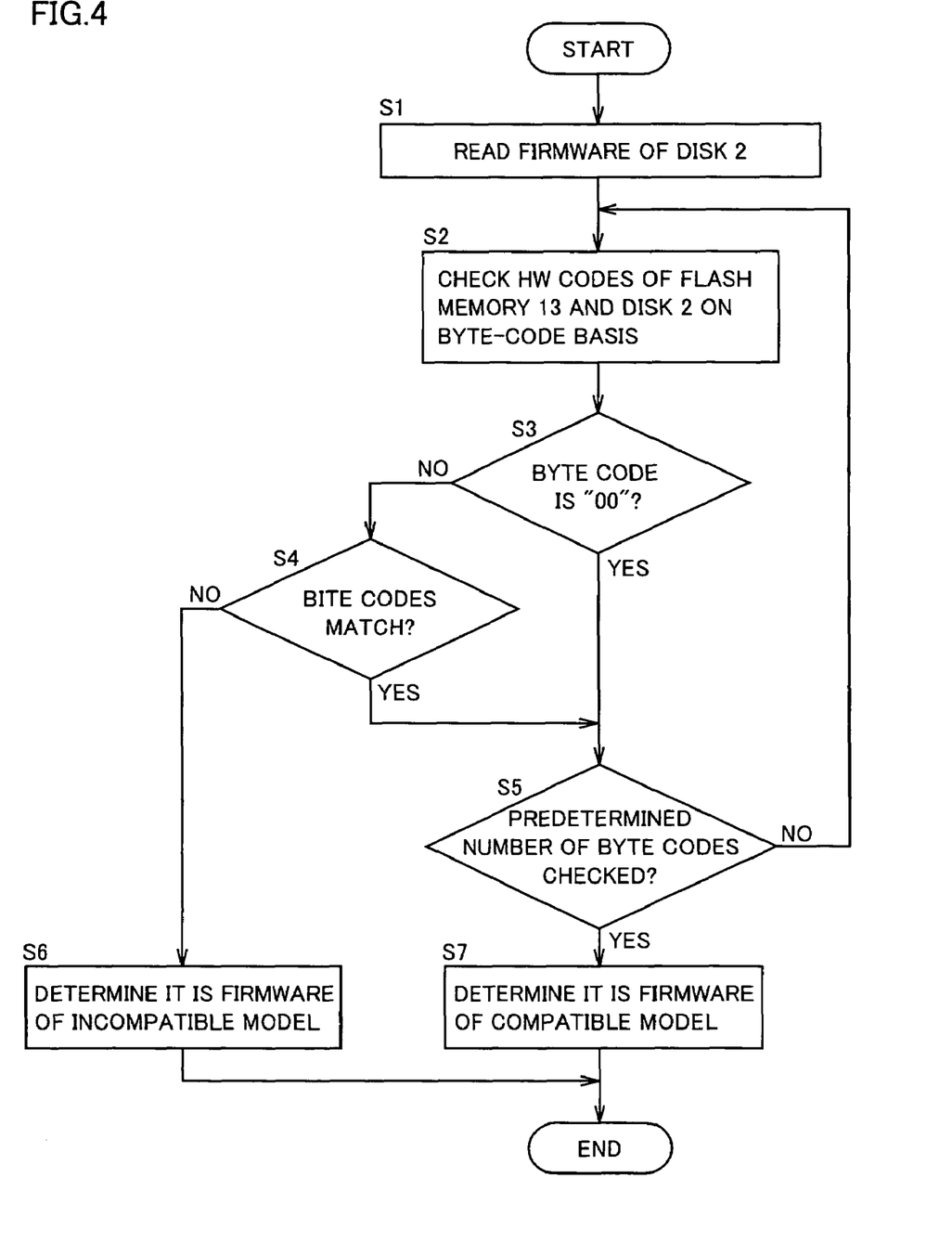
FIG. 4 is a flowchart illustrating an operation of determining whether firmware of a disk is firmware of a compatible model.

FIG. 4 is a flowchart illustrating an operation of determining whether or not the firmware on disk 2 is firmware of a compatible model. Referring to FIG. 4, in step S1, CPU 12 reads the firmware on disk 2 into SDRAM 14. Then, in step S2, the HW code of the firmware stored in flash memory 13 and the HW code of the firmware of the read disk 2 are checked on the byte-code basis successively.

In step S3, it is determined whether or not at least one of two corresponding byte codes respectively of flash memory 13 and disk 2 is "00." Here, when both of the two byte codes are not "00" (NO), the flow proceeds to step S4. When at least one of the two byte codes is "00" (YES), the flow proceeds to step S5.

In step S4, two corresponding byte codes respectively of flash memory 13 and disk 2 are compared with each other. When the two byte codes match (YES), the flow proceeds to step S5. When the two byte codes do not match (NO), the flow proceeds to step S6 to determine that the firmware of disk 2 is not firmware of a compatible model and stop the upgrade operation.

In step S5, when all of a predetermined number of byte codes have not been checked (NO), the flow returns to step S2 to check the following byte codes. In contrast, when all of the predetermined number of byte codes have been checked (YES), the flow proceeds to step S7 to determine that the firmware on disk 2 is firmware of a compatible model and start the upgrade operation. Then, it is confirmed that the firmware on disk 2 is of a new version and thereafter the firmware in flash memory 13 is rewritten into the firmware of a new version.

The operation from step S2 to S7 is now described in more detail with reference to FIG. 3. First, the first byte code #1 of the HW code of the firmware of flash memory 13 and that of the HW code of the firmware of disk 2 are checked. Specifically, byte code #1 "02" of flash memory 13 and byte code #1 "02" of disk 2 are checked (step S2). Here, since both of respective byte codes #1 are not "00," respective byte codes #1 are compared with each other (steps S3, S4). Here, respective byte codes #1 match and thus the second byte codes #2 are checked (steps S5, S2). Specifically, byte code #2 "01" of flash memory 13 and byte code #2 "01" of disk 2 are checked (step S2). Here, since both of respective byte codes #2 are not "00," respective byte codes #2 are compared with each other. Here, since respective byte codes #2 match, subsequently the third byte codes #3 are checked (steps S5, S2). Since all byte codes up to and including the fourteenth byte codes #14 match, a similar operation is repeated. Then, the fifteenth byte codes #15 are checked (step S2). Specifically, byte code #15 "00" of flash memory 13 and byte code #15 "02" of disk 2 are checked (step S2). Here, since byte code #15 of flash memory 13 is "00," respective byte codes #15 are not compared (steps S3, S5). Then, the sixteenth byte codes #16 are checked (step S2). Specifically, byte code #16 "00" of flash memory 13 and byte code #16 "00" of disk 2 are checked (step S2). Here, since both of byte code #16 of flash memory 13 and byte code #16 of disk 2 are "00," respective byte codes #16 are not compared with each other (steps S3, S5). Here, as all of a predetermined number (16) of byte codes have been checked, it is determined that the firmware on disk 2 is firmware of a compatible model (step S7) and the upgrade is started. Then, after it is confirmed that the firmware on disk 2 is of a new version, the firmware in flash memory 13 is rewritten into the firmware of the new version.

As discussed above, according to the first embodiment, byte codes #15, #16 of the HW code of flash memory 13 are used as an extra reserve code that does not substantially indicate the attribute of the target hardware. Then, when it is determined whether or not the firmware on disk 2 is firmware of a compatible model, byte codes #15, #16 of disk 2 corresponding to the reserve code (byte codes #15, #16) of flash memory 13 are ignored. In other words, if byte codes #1 to #14 of flash memory 13 are compared with byte codes #1 to #14 of disk 2 and all of the corresponding byte codes match each other, it is determined that the firmware on disk 2 is firmware of a compatible mode.

Regarding the conventional disk device, even if it is tried to use disk 2 on which stored new-version firmware compatible with the disk device of model B to upgrade the firmware of disk device 1 of model A, the upgrade cannot be achieved due to the difference in HW code. Specifically, the upgrade cannot be achieved since the attribute code of disk 2 has its code length (15) longer than the code length (14) of the attribute code of flash memory 13 and accordingly it is determined that the firmware on disk 2 is not firmware of a compatible model. In contrast, according to the first embodiment, even if the attribute code of disk 2 and that of flash memory 13 have respective code lengths different from each other, the rewrite can be done. Accordingly, respective firmwares of disk devices that are of compatible models can be upgraded using firmware of any of the models to improve firmware compatibility.

Modification of the First Embodiment

Figure 5:
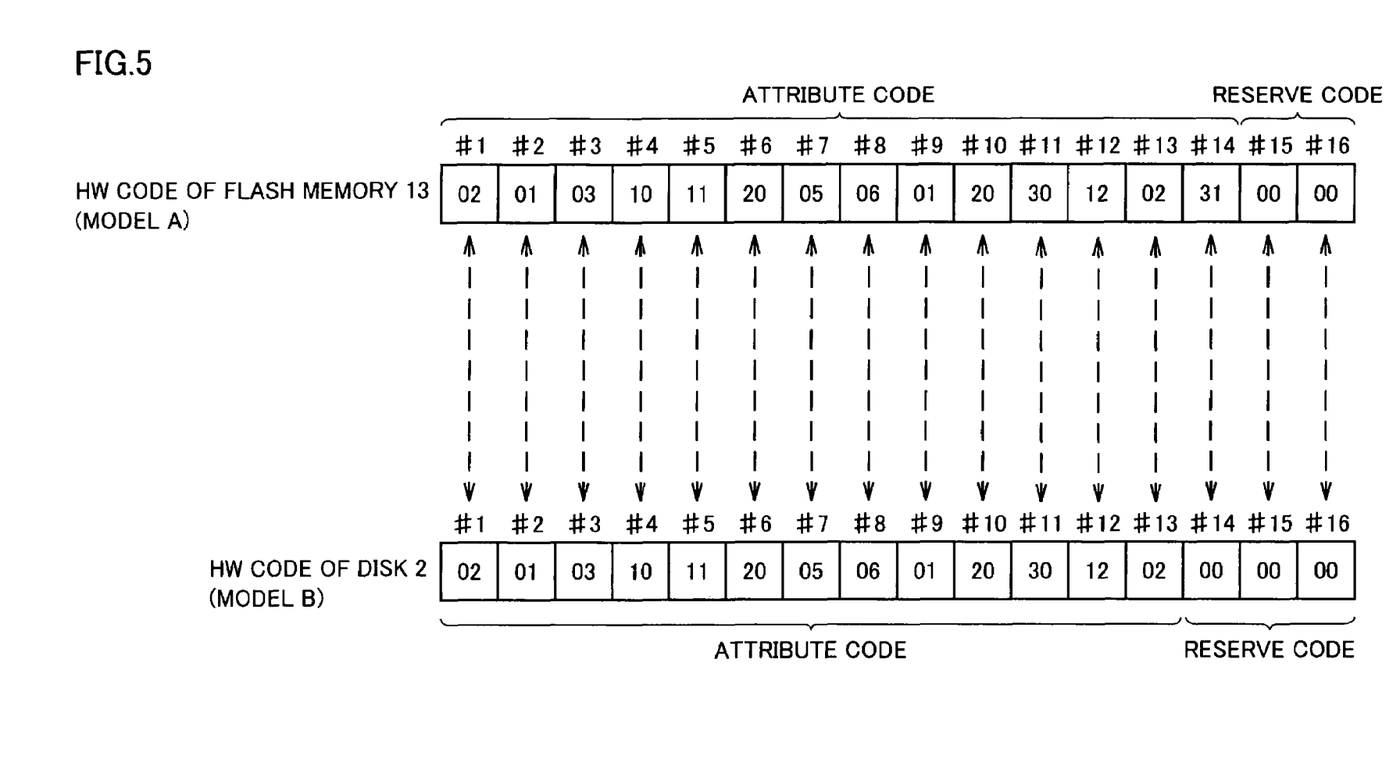
FIG. 5 shows respective structures of an HW code of firmware of a flash memory and an HW code of firmware of a disk according to a modification of the first embodiment.

FIG. 5 shows respective structures of an HW code of firmware of flash memory 13 and that of disk 2 according to a modification of the first embodiment, provided for comparison with FIG. 3. Referring to FIG. 5, FIG. 5 differs from FIG. 3 in that byte codes #14, #15 of the HW code of disk 2 are "00." Here, concerning any elements in FIG. 5 corresponding to those in FIG. 3, the detailed description is not repeated.

In this case, byte codes #14 to #16 of the HW code of disk 2 storing new-version firmware compatible with a disk device of model C serve as an extra reserve code that does not substantially indicate the attribute of the firmware. When it is determined that whether or not the firmware of disk 2 is firmware of a compatible model, byte codes #14 to #16 of flash memory 13 corresponding to the reserve code (byte codes #14 to #16) of disk 2 are ignored. Specifically, byte codes #1 to #13 of flash memory 13 are compared with byte codes #1 to #13 of disk 2 and, when corresponding byte codes all match, it is determined that the firmware on disk 2 is firmware of a compatible model.

Regarding the conventional disk device, even if it is tried to use disk 2 on which stored new-version firmware compatible with the disk device of model C to upgrade the firmware of disk device 1 of model A, the upgrade cannot be achieved due to the difference in HW code. Specifically, the upgrade cannot be achieved since the attribute code of disk 2 has its code length (13) shorter than the code length (14) of the attribute code of flash memory 13 and accordingly it is determined that the firmware on disk 2 is not firmware of a compatible model. In contrast, according to the modification of the first embodiment, even if the attribute code of disk 2 and that of flash memory 13 have respective code lengths different from each other, the rewrite can be done. Accordingly, respective firmwares of disk devices that are of compatible models can be upgraded using firmware of any of the models to improve firmware compatibility.

Further, while it is described above that the HW code has a code length of 16, the code length may be any arbitrary length. Moreover, respective code lengths of the attribute code and reserve code each may also be any arbitrary length.

Furthermore, while it is described above that the reserve code is provided in an end portion of the HW code, the reserve code may be provided in such an arbitrary portion as central portion of the HW code. In this case, similar effects are achieved as well.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disk device comprising:
   a nonvolatile memory storing first firmware for performing basic control of said disk device,
   said first firmware stored in said nonvolatile memory including a first hardware code that represents an attribute of hardware of said disk device, and second firmware stored on a disk including a second hardware code that represents an attribute of target hardware,
   said first hardware code including a first attribute code that substantially represents the attribute of the hardware of said disk device, and said second hardware code including a second attribute code that substantially represents the attribute of said target hardware and that is different in code length from said first attribute code, and at least one of said first hardware code and said second hardware code further including a reserve code adjusting the code length of the attribute code of said at least one of said first hardware code and said second hardware code so as to match the code length of said first hardware code with the code length of said second hardware code; and a control unit responding to a command to rewrite said first firmware to compare said first hardware code with said second hardware code while ignoring a code corresponding to said reserve code and, when said first and second hardware codes match each other, determining that said second firmware is compatible firmware to start a a rewrite operation and, when said first and second hardware codes mismatch, determining that said second firmware is incompatible firmware to cancel a rewrite operation.

2. The disk device according to claim 1, wherein said first attribute code and said second attribute code are each comprised of plurality of byte codes each represented by one of hexadecimal numbers from "01" to "FF," and said reserve code is comprised of a byte code represented by "00."

3. A firmware determining method determining, in the case where a disk is used to rewrite first firmware for performing basic control of a disk device, whether second firmware stored on said disk is compatible firmware, wherein said first firmware stored in a nonvolatile memory includes a first hardware code that represents an attribute of hardware of said disk device, and said second firmware stored on said disk includes a second hardware code that represents an attribute of target hardware, said first hardware code including a first attribute code that substantially represents the attribute of the hardware of said disk device, and said second hardware code including a second attribute code that substantially represents the attribute of said target hardware and that is different in code length from said first attribute code, at least one of said first hardware code and said second hardware code further includes a reserve code adjusting the code length of the attribute code of said at least one of said first hardware code and said second hardware code so as to match the code length of said first hardware code with the code length of said second hardware code, and in response to a command to rewrite said first firmware, said first hardware code is compared with said second hardware code while a code corresponding to said reserve code is ignored and, when said first and second hardware codes match each other, it is determined that said second firmware is compatible firmware and, when said first and second hardware codes mismatch, it is determined that said second firmware is incompatible firmware.

4. The disk device according to claim 1, wherein said first hardware code and said second hardware code are each comprised of a plurality of byte codes, said reserve code is comprised of a byte code different from the byte code of said first and second attribute codes, and said control unit compares the plurality of byte codes included in said first hardware code with the plurality of byte codes included in said second hardware code in pairs, determines that a pair of byte codes compared with each other match each other when at least one of the pair of byte codes compared with each other is said reserve code, and determines that said first and second hardware codes match each other when all of a plurality of pairs of byte codes compared with each other match each other.

* * * * *

UNITED STATES PATENT AND TRADEMARK OFFICE
CERTIFICATE OF CORRECTION

PATENT NO. : 7,490,232 B2  Page 1 of 1
APPLICATION NO. : 11/283553
DATED : February 10, 2009
INVENTOR(S) : Mitsuru Kawakita It is certified that error appears in the above-identified patent and that said Letters Patent is hereby corrected as shown below:

On the Cover Page, item (75) Inventors, the city "Daito" should be

--Osaka--.

In Claim 1, column 7, line 17, "a a rewrite" should read --a rewrite--.

In Claim 2, column 7, line 23, "each comprised of plurality of..." should read

--each comprised of a plurality of...--.

Signed and Sealed this

Sixteenth Day of June, 2009

JOHN DOLL
*Acting Director of the United States Patent and Trademark Office*